H. M. WEBER.
MAKING OLEUM OF PREDETERMINED STRENGTH.
APPLICATION FILED FEB. 17, 1917.
1,233,627.
Patented July 17, 1917.
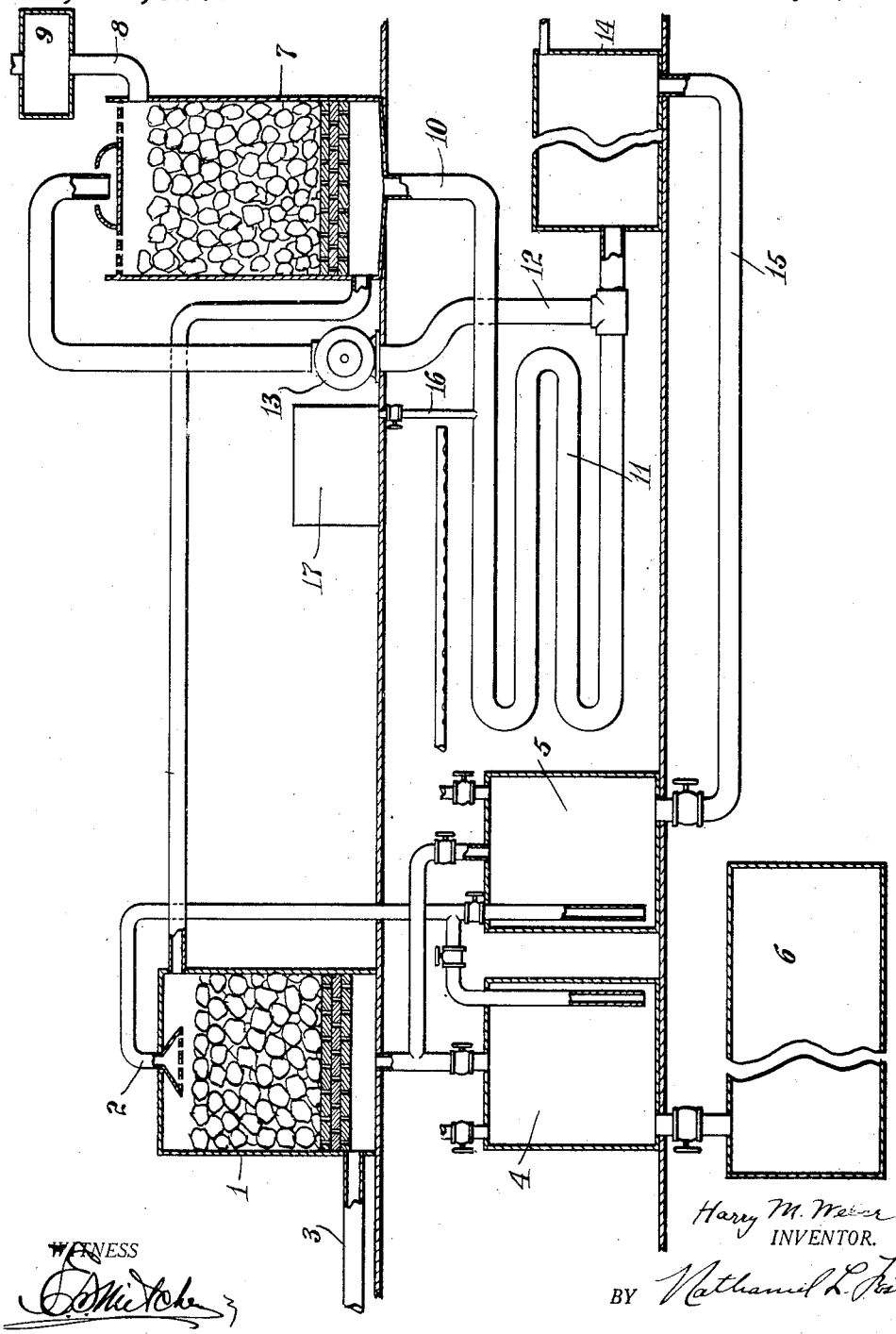
Harry M. Weber
INVENTOR.
BY Nathaniel L. Foster
ATTORNEY

UNITED STATES PATENT OFFICE.

HARRY M. WEBER, OF EAST ORANGE, NEW JERSEY, ASSIGNOR TO ELLIS-FOSTER COMPANY, A CORPORATION OF NEW JERSEY.

MAKING OLEUM OF PREDETERMINED STRENGTH.

1,233,627.   Specification of Letters Patent.   Patented July 17, 1917.

Application filed February 17, 1917. Serial No. 149,269.

*To all whom it may concern:*

Be it known that I, HARRY M. WEBER, a citizen of the United States, residing at East Orange, in the county of Essex and State of New Jersey, have invented certain new and useful Improvements in Making Oleum of Predetermined Strength, of which the following is a specification.

This invention relates to a method of producing pyro sulfuric acid or Nordhausen acid or what in commercial parlance is known as oleum, such product being represented preferably by about 20–40% strength of sulfur trioxid, which method involves treating anhydrous sulfuric acid with sulfur trioxid in the manner hereinafter described.

Reference is made to the accompanying drawings which show partly in elevation and partly in section a form of apparatus which may be used in carrying out my process.

In the drawings, 1 is an absorbing tower having fragments of quartz or similar material filling its interior. Anhydrous sulfuric acid, that is, an acid of 100% strength is arranged to be entered at the top through the pipe 2, while sulfur trioxid admixed with other gases is entered through the pipe 3. The tanks 4 and 5 contain the acid resulting from such passage through tower 1 and the acid may be discharged from one tank into the other by the way of the tower 1 through the agency of compressed air or suitable pumping devices. 6 is a tank for the storage of the finished fuming or pyro sulfuric acid which may be of a strength or concentration represented by 20% to 40% sulfur trioxid or be even of still higher concentration or strength under some circumstances. In the operation of this portion of the apparatus fuming acid from the tank 4, for example, is forced through the tower 1 meeting with an upward current of sulfur trioxid as the acid flows down over the quartz particles or fragments. The acid is collected in the tank 5 and is passed back and forth from the tank 4 to the tank 5 by the way of the absorbing tower 1 until pyro sulfuric, or Nordhausen acid (oleum) of a strength represented by say 20% SO$_3$ (or any other suitable strength) is produced.

7 is a tower somewhat similar to the tower 1 through which an absorbing liquid initially anhydrous sulfuric acid is caused to circulate while sulfur trioxid unabsorbed in the tower 1 is brought in at the bottom of the tower 7 and allowed to pass therethrough, the residual gases passing out through the pipe 8 into the drum 9, the latter being employed to catch any acid which is mechanically carried along by the gases. At the bottom of the tower an outlet pipe 10 leads to a cooling coil 11 and from the discharge end of the latter a pipe 12 having a pump 13 forces the cooled acid into the tower 7 again. 14 is a storage tank for collecting a supply of 100% of anhydrous sulfuric acid which is used to supply the tanks 4 and 5. The acid passing through the tower 7 is converted from ordinary anhydrous sulfuric acid or acid of 100% strength to pyro sulfuric acid dissolved in the anhydrous acid and having the equivalent of about 1% to 5% of sulfur trioxid above anhydrous sulfuric acid according to conditions and is diluted to ordinary anhydrous sulfuric acid by the addition of a supply of water or weaker sulfuric acid such as acid of 75–93% strength which is allowed to run into the apparatus from the tank 17 through the pipe 16, the amount being regulated to reduce the strength of the acid coming from the tower 7 through pipe 10 to yield approximately a 100% product. This is discharged into the storage tank 14, retaining in the circulating system only sufficient to keep the tower 7 well supplied with acid.

Thus in the tower 1 acid of 100% strength is gradually converted to pyro sulfuric acid material represented by a strength expressed as say 20% content of sulfur trioxid (or any other suitable strength) the supply of 100% acid coming from the tower 7 into which 100% acid is introduced, and is gradually raised to a degree of conversion to pyro sulfuric acid material represented by say 5% of sulfur trioxid or to some intermediate point, a conversion represented by a gain of at least 1% SO$_3$ in passing through the tower being suitable. This acid is then mixed with weak sulfuric acid to produce ordinary anhydrous sulfuric acid and any surplus over that required for the tower 7 is collected in the storage tank 14 and supplied to the tanks 4 and 5 as required.

In some cases it is not desirable to carry out the reduction of the pyro sulfuric acid solution with a dilute acid in the manner indicated but is preferable to add the diluting agent to the pyro sulfuric acid solution contained in, for example, the tank 14.

The invention will be seen to comprise the absorption of sulfur trioxid in several stages, preferably two, as shown in the embodiment illustratively set forth herein. In one member of the absorbing apparatus sulfur trioxid gases coming from the converter after suitable cooling to say 70° F., are passed into an absorbing tower, into the top of which is entered as an initial absorbing medium ordinary anhydrous sulfuric acid which is converted to pyro sulfuric acid to the extent represented by a content of 20% sulfur trioxid or other suitable strength of pyro sulfuric acid and a second member for absorbing the greater proportion of the residual sulfur trioxid into which absorbing member is fed ordinary sulfuric acid of about 100% strength, which acid takes up the major portion of the residual sulfur trioxid and the resulting acid is mixed or diluted with weak sulfuric acid, in some cases, suitably cooled as may be required and the product which is of now approximately ordinary anhydrous sulfuric acid is fed to the first absorbing member aforesaid.

Finally it may be stated that my invention as indicated is directed to the production of oleum or Nordhausen acid or pyro sulfuric acid or such acid in solution in anhydrous sulfuric acid to yield products of various strengths of the pyro sulfuric acid. In this connection it may be stated that my invention is not concerned with the production of ordinary sulfuric acid containing water such as acid ranging in strength between 90 and 100% ordinary sulfuric acid. To this end I may start with moisture-free sulfuric acid or acid which is at least anhydrous and convert such anhydrous acid into pyro sulfuric acid to such an extent as may be desired, thus affording a solution of pyro sulfuric acid in moisture-free ordinary sulfuric acid and my invention enables the production of oleum having various strengths or concentrations of pyro sulfuric acid which may be conveniently expressed in practical terms as represented by approximately 20 to 40% sulfur trioxid above that present in a combined form in ordinary anhydrous sulfuric acid.

What I claim is:—

1. The process of making a solution of pyro sulfuric acid in anhydrous sulfuric acid, which comprises bringing gases containing sulfur trioxid into contact as a counter current with water-free sulfuric acid, in causing the acid vehicle to circulate as a counter current in contact with the gaseous material to effect a first stage of absorption; whereby sulfur trioxid is absorbed to an extent of approximately 20%, in withdrawing the gases, partially depleted of sulfuric acid, from contact with said counter current, in passing these residual gases into contact with a second counter current of anhydrous sulfuric acid to create a second absorption stage; thereby absorbing between 1% and 5% of sulfur trioxid and in also thereby substantially removing the residue of sulfur trioxid in said gases, in discharging the waste gases, in collecting the acid resulting from the second stage, in mixing with a diluting agent to convert the product to approximately 100% of anhydrous sulfuric acid, in cooling the resulting acid mix, in using a portion thereof in the first absorption stage and in retaining the remainder of said acid for use in the second absorption stage.

2. The process of making a solution of pyro sulfuric acid in anhydrous sulfuric acid, which comprises bringing gases containing sulfur trioxid into contact with substantially water-free sulfuric acid to create a first stage of absorption; whereby pyro sulfuric acid is formed, in withdrawing the gases partially depleted of sulfur trioxid, after brief contact with the acid employed in the first stage of absorption, in passing these gases into contact with a second body of absorbing acid consisting of sulfuric acid of 100% strength to create a stage of second or residual absorption; thereby bringing about the absorption of from 1 to 5% of sulfur trioxid, in collecting the acid, in mixing with a diluting agent to convert to ordinary anhydrous sulfuric acid of 100% strength, in cooling the resulting acid mix obtained from the second stage of absorption, in using a portion in the first stage of absorption and in retaining the remainder of said acid for use in the second stage of absorption.

3. The process of making a solution of pyro sulfuric acid in anhydrous sulfuric acid which comprises bringing gases containing sulfur trioxid into contact with anhydrous sulfuric acid, in causing the acid to circulate as a counter current in contact with the gaseous material to create a stage of first absorption; whereby pyro sulfuric acid is formed, in withdrawing the gases partially depleted of sulfur trioxid, in passing these gases into contact with a second counter current of anhydrous sulfuric acid to create a stage of second absorption; thereby converting such acid to a product containing pyro sulfuric acid represented by a strength of 1 to 5% sulfur trioxid; in collecting the acid so formed, in mixing with a diluting agent to convert the acid to ordinary anhydrous sulfuric acid, in using a portion thereof in the first stage of absorption and in retaining the remainder of said acid for use in the second stage of absorption.

4. The process of making a solution of pyro sulfuric acid in ordinary anhydrous sulfuric acid which comprises passing an upwardly moving current of gases containing sulfur trioxid into contact with a counter current comprising sulfuric acid of about 100% strength, in causing the acid absorbing vehicle to circulate in contact with the gaseous material, thereby creating a first stage of absorption, whereby the strength of the acid is increased by absorption of sulfur trioxid until it contains a substantial proportion of pyro sulfuric acid dissolved in anhydrous sulfuric acid, which mixture is collected and withdrawn from the cycle, in withdrawing the gases from contact with the counter current of acid, in passing these gases into contact with a second stage counter current of sulfuric acid of approximately 100% strength; whereby sulfur trioxid is absorbed to an extent to substantially remove the residue of sulfur trioxid left in the gases from the first stage of absorption, in discharging the waste gases, in collecting the resulting acid, in mixing this acid with a diluting agent to convert to ordinary anhydrous sulfuric acid, in cooling the resulting second stage acid mix, in using a portion as fresh material for the first absorption stage and in retaining the remainder of said acid for use in the second absorption stage.

5. The process of making a solution of pyro sulfuric acid in ordinary anhydrous sulfuric acid, yielding what is known in commerce as oleum, which comprises bringing a current of gases containing sulfur trioxid into contact with a first stage counter current of absorbing acid consisting initially of sulfuric acid of 100% strength, in causing the acid to circulate as a counter current in contact with the gaseous material, whereby the acid is converted into a solution of pyro sulfuric acid dissolved in ordinary anhydrous sulfuric acid, such concentration of pyro sulfuric acid being represented by 20% sulfur trioxid, in withdrawing the gases from contact with the first stage counter current of acid, in passing these gases into contact with a second stage counter current of sulfuric acid of 100% strength, thereby forming pyro sulfuric acid and at the same time absorbing substantially the residue of sulfur trioxid left from the first stage of absorption, in discharging the waste gases, in collecting the acid product, in mixing this acid material with dilute sulfuric acid to form sulfuric acid of 100% strength, in conveying a portion of the 100% acid so obtained for use in the first absorption stage and in retaining another portion of said acid for use in the second absorption stage.

6. The process of absorbing sulfuric anhydrid from gases containing it, which consists in passing a current of such gases into contact with a counter current comprising sulfuric acid, the initial strength of such counter current being approximately 100% sulfuric acid and in suitably diluting the acid after absorption of sulfur trioxid, such dilution at no time forming acid containing free moisture.

7. The two stage process of absorbing sulfuric anhydrid from gases containing it, which consists in passing a current of such gases into contact with two counter currents of sulfuric acid, the acid of each counter current being free from moisture and in suitably diluting the acid after sulfur trioxid has been absorbed, such dilution at no time lowering the acid to a strength below 100%.

8. The process of making a solution of pyro sulfuric acid in anhydrous sulfuric acid, which comprises passing gases containing sulfur trioxid into contact with sulfuric acid free from moisture, whereby pyro sulfuric acid is formed and a portion of the sulfur trioxid is removed from such gases and in bringing the residual gases into contact with sulfuric acid free from moisture; whereby substantially the residual sulfur trioxid of the gases is absorbed.

9. The multiple process of absorbing sulfuric anhydrid from gases containing it which consists in passing a current of such gases into contact with a plurality of counter currents of sulfuric acid, the initial strength of each counter current being 100% acid and in suitably diluting the resulting acid after absorption of sulfuric anhydrid, such dilution being insufficient to lower the acid to a strength below 100%.

10. The process of making pyro sulfuric acid material which comprises passing gases containing sulfuric anhydrid into contact with thin layers of sulfuric acid of 100% strength, in allowing this acid to partially remove the sulfuric anhydrid from said gases; in passing the gases containing the residual sulfuric anhydrid into contact with thin layers of approximately 100% sulfuric acid, in collecting the acid product derived in this manner, and in converting it to approximately 100% strength.

11. The process of making pyro sulfuric acid or oleum which comprises passing gases containing sulfuric anhydrid into contact with anhydrous sulfuric acid, in allowing this acid to largely remove the sulfuric anhydrid from said gases; whereby the acid is increased in contact of sulfuric anhydrid to a predetermined strength of pyro sulfuric acid, in passing the gases containing the residual sulfuric anhydrid into contact with thin layers of approximately 100% sulfuric acid, in collecting the resulting liquid, in converting it to approximately 100% by suitable dilution and in using some portion thereof for the initial absorption of sulfuric anhydrid from said gases.

12. The process of making pyro sulfuric acid which comprises passing gases containing sulfuric anhydrid into contact with sulfuric acid of 100% strength, in allowing this acid to partially remove the sulfuric anhydrid from said gases; in passing the gases containing the residual sulfuric anhydrid into contact with approximately 100% sulfuric acid, in collecting the resulting acid, in converting it to approximately 100% sulfuric acid by suitable dilution and in using some portion thereof for the initial absorption of sulfuric anhydrid from said gases.

13. The process of making pyro sulfuric acid which comprises passing gases containing sulfuric anhydrid into contact with sulfuric acid containing some pyro sulfuric acid, in allowing this absorbing vehicle to partially remove the sulfuric anhydrid from said gases; whereby the acid is increased in content of sulfuric anhydrid to a predetermined strength of pyro sulfuric acid, in passing the gases containing the residual sulfuric anhydrid into contact with thin layers of anhydrous sulfuric acid, in collecting the resulting acid, in converting it to approximately 100% sulfuric acid by suitable dilution and in using some portion thereof for the initial absorption of sulfuric anhydrid from said gases.

14. The process of absorbing sulfuric anhydrid in two stages which comprises passing gases containing sulfuric anhydrid into contact successively with two counter currents of sulfuric acid of an initial strength of 100%.

15. The process of absorbing sulfuric anhydrid which comprises passing gases containing sulfuric anhydrid into contact successively with two counter currents of anhydrous acid.

16. The process of absorbing sulfuric anhydrid which comprises passing gases containing sulfuric anhydrid into contact successively with a plurality of counter currents of anhydrous sulfuric acid.

17. The process of absorbing sulfuric anhydrid which comprises passing gases containing sulfuric anhydrid into contact successively with a plurality of counter currents of initially-anhydrous sulfuric acid.

HARRY M. WEBER.